United States Patent [19]
Hopkins

[11] 3,831,390
[45] Aug. 27, 1974

[54] METHOD AND APPARATUS FOR CONTROLLING REFRIGERANT TEMPERATURES OF ABSORPTION REFRIGERATION SYSTEMS

[75] Inventor: Neil E. Hopkins, York, Pa.

[73] Assignee: Borg-Warner Corporation, Chicago, Ill.

[22] Filed: Dec. 4, 1972

[21] Appl. No.: 312,171

[52] U.S. Cl............................ 62/101, 62/141, 62/476
[51] Int. Cl............................................. F25b 15/06
[58] Field of Search..................... 62/101, 141, 476

[56] References Cited
UNITED STATES PATENTS

| | | | |
|---|---|---|---|
| 3,306,073 | 2/1967 | Stephan | 62/489 X |
| 3,374,644 | 3/1968 | Foster | 62/141 |
| 3,426,547 | 2/1969 | Foster | 62/101 |
| 3,555,839 | 1/1971 | Leonard, Jr. | 62/101 |
| 3,555,840 | 1/1971 | Leonard, Jr. | 62/101 |
| 3,625,021 | 12/1971 | Dyre | 62/476 |
| 3,695,052 | 10/1972 | Griffin | 62/141 X |
| 3,695,053 | 10/1972 | Griffin | 62/141 X |

*Primary Examiner*—William F. O'Dea
*Assistant Examiner*—Peter D. Ferguson
*Attorney, Agent, or Firm*—Donald W. Banner

[57] ABSTRACT

A method and apparatus for producing and controlling hygroscopic salt content in the water refrigerant circuit of an absorption refrigeration system by introducing absorbent solution from the solution circuit to the refrigerant circuit and providing a controlled, predetermined percentage of salt concentration in the refrigerant circuit to lower the freezing point of the water refrigerant.

3 Claims, 1 Drawing Figure

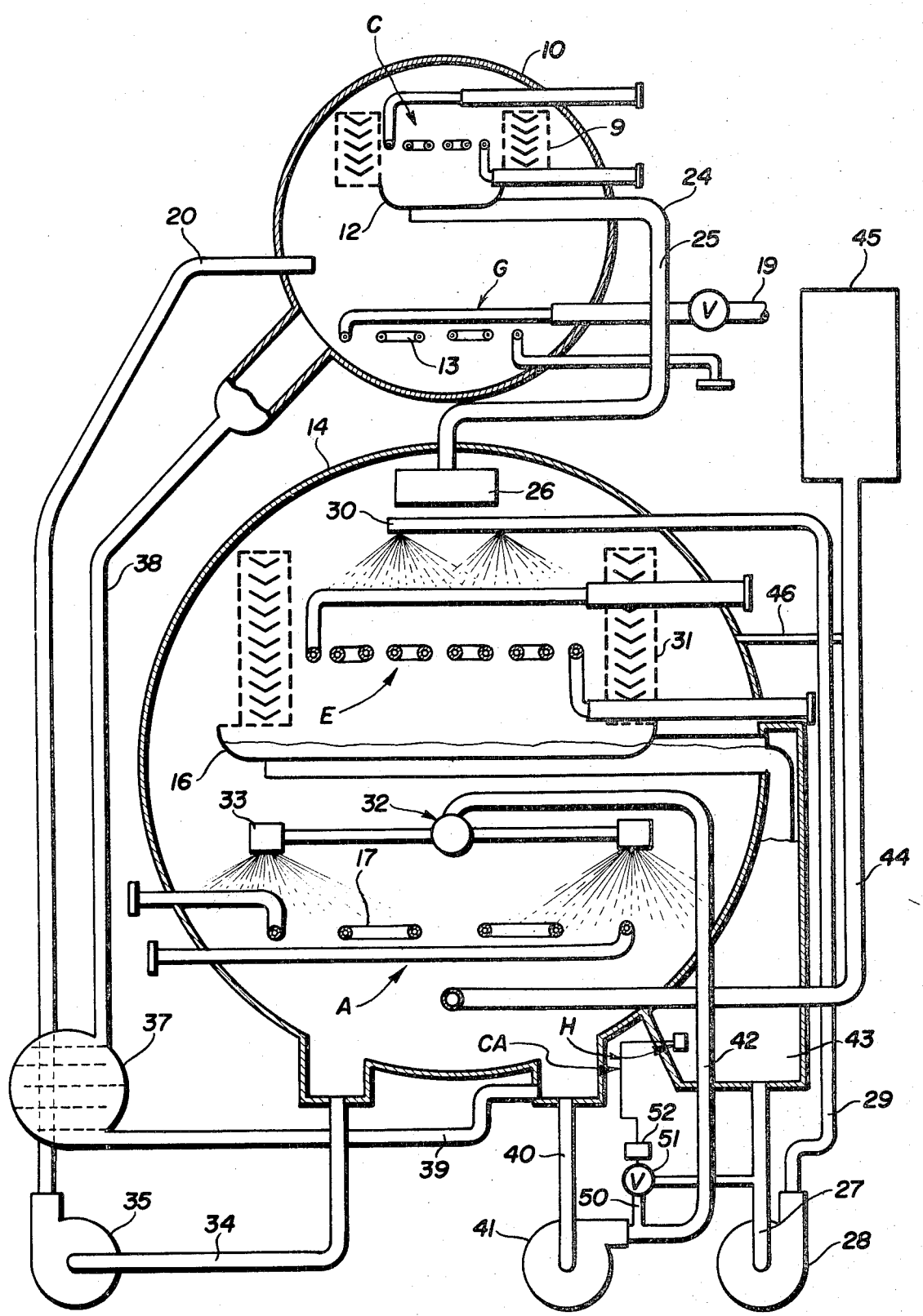

3,831,390

METHOD AND APPARATUS FOR CONTROLLING REFRIGERANT TEMPERATURES OF ABSORPTION REFRIGERATION SYSTEMS

BACKGROUND AND SUMMARY OF THE INVENTION

This invention relates to a method and apparatus for controlling refrigerant temperatures of absorption refrigeration machines.

Absorption refrigeration systems employing hygroscopic salts, such as lithium bromide, are usually designed, and every effort is made, to limit the concentration of absorbent solution at various locations in the system, during normally encountered operating conditions. This is done to prevent salt build-up in the water refrigerant and possible solidification of the absorbent solution and thereby to prevent seriously impairing operation of the system. To avoid this problem, eliminators are supplied in the generator-condenser portion of the system between the generator and condenser surfaces, to present a barrier to saltcontaining liquid droplets tending to flow with the vapor into the condenser. In one conventional system, this carryover is notably absent; although at times, such as during initial operation where high tonnages are involved, there may be a small amount of carryover, resulting in about 2 percent lithium bromide salt content in the refrigerant. As the water evaporates in the evaporator, it tends to leave salt therein. If there is a small amount of droplet carryover through eliminators provided between the evaporator and absorber, this tends to provide a small amount of continuous transfer of refrigerant (with salt) to the solution circuit. This operation, commonly referred to as "blowdown" thus removes salt from the refrigerant. In another prior system, a small amount of blowdown from the refrigerant circuit (e.g. 2 lb./min.) is provided for the purpose of keeping the salt content low in the refrigerant. In the third prior system, an automatic blowdown valve is controlled by float switches in the evaporator pan so that, at high load, when the refrigerant level tends to rise in the evaporator pan, the float switch will energize a solenoid to bring about a momentary blowdown condition. Also, at system shutdown during a dilution cycle, this same blowdown valve opens, thereby tending to remove any salt in the refrigerant circuit. In these standard systems, the described dilution controls are effective only to prevent salt build-up in the refrigerant by acting to maintain the absorbent concentrations within a predetermined range, which necessarily limits the systems to a minimum refrigerant temperature of 35°F.

The present invention is directed to a novel method and apparatus for maintaining the hygroscopic salt content of a refrigerant at a predetermined concentration for the purpose of lowering the freezing point of the refrigerant to temperatures below 35°F., while preventing salt build-up in the refrigerant to an extent which might impair the operation of the absorption system.

In describing the system, reference will be made herein to a typical absorption refrigeration apparatus in which the generator and condenser are arranged in one shell, and the evaporator and abosrber are arranged in another shell. It is obvious, however, that absorption refrigeration machines may take many other forms and the description should not be restricted to the particular arrangement described. Also, while the specification refers to an absorption refrigeration system of the type using lithium bromide as the absorbent solution, many other absorbent-refrigerant combinations are known; and it is not intended that the invention be limited to this particular system.

DESCRIPTION OF THE DRAWING

The FIGURE is a schematic illustration of an absorption refrigeration system incorporating the principles of the present invention.

DESCRIPTION OF THE PREFERRED EMBODIMENT

The absorption refrigeration machine shown in the FIGURE is arranged in a two-shell configuration. An upper shell 10 includes a tube bundle 11 which cooperates with a pan 12 to provide a condenser C; and a second tube bundle 13 cooperates with the lower portion of shell 10 to provide a generator G. In a lower shell 14, a tube bundle 15 is arranged above a pan 16, which cooperate to provide an evaporator E; and a fourth tube bundle 17, located underneath pan 16, is associated with the absorber A.

As is well understood by those skilled in the art, the operation of an absorption refrigeration machine depends on a refrigerant that boils at a temperature below that of a liquid being chilled, and an absorbent possessing great affinity for the refrigerant. In the particular system to be described, the refrigerant is water and the absorbent is in aqueous solution of a hygroscopic salt such as lithium bromide. Other hygroscopic salts, such as zinc bromide, calcium bromide, lithium iodide, or mixtures of these salts, may be employed. While some absorption machines actually circulate the refrigerant directly to a load, the apparatus illustrated herein uses a secondary heat exchange medium (usually water) which is chilled in the evaporator by indirect contact with the refrigerant and then circulated to and from the load.

The generator G, the condenser C, the evaporator E and the absorber A are connected to provide a closed-circuit, continuous-cycle refrigeration system. Relatively dilute absorbent solution is circulated to the generator G through a conduit 20 where it contacts tube bundle 13, to which a heating medium, such as steam or hot water, is supplied through a line 19. Under the pressure conditions existing in the upper shell (about 1/10 atmosphere) the solution boils, releasing water vapor and concentrating the solution. The water vapor boiled off in the generator flows upwardly through eliminators 8 and 9 to the condenser C where the vapor is brought into contact with tube bundle 11 through which cooling water (from a cooling tower or the like) is circulated. The refrigerant condensed on the tube bundle is collected in pan 12 and forwarded through a conduit 24, which contains an orifice 25 to maintain the proper pressure differential between the shells, to a refrigerant distributor 26 located above the evaporator. The refrigerant discharged from distributor 26, mostly liquid but containing some vapor, flows downwardly in contact with the evaporator tube bundle 15, commonly referred to as the chilled water coil, where it boils and abstracts heat from the water circulating therethrough, lowering the temperature. Unevaporated refrigerant collects in pan 16 and flows through a compartment or sump 43 at one side of the lower shell and then through a refrigerant conduit 27 to the inlet side of a refrigerant pump 28. From there, it completes a circuit as it is circulated back to the evaporator through a conduit 29 and a spray header 30 positioned above the chilled water coil 15. The water vapor formed in the evaporator by contact with the chilled water coil passes through eliminators 31, employed to reduce the amount of liquid refrigerant carried into the absorber, and sweeps downwardly into the absorber A where it is absorbed in the solution, the heat of solution being removed by contact with the absorber tube bundle 17.

As the water vapor is dissolved in absorbent solution, the solution naturally becomes more dilute and is withdrawn through a conduit 34 to the inlet side of a generator pump 35. The relatively cool, dilute solution to be forwarded to the generator passes through a solution heat exchanger 37 where it is brought into heat exchange relation with the hot, concentrated solution passing from the generator through a conduit 38. The relatively concentrated solution is cooled through an appreciable range, withdrawn from solution heat exchanger 37 through a conduit 39, and introduced into a stream of relatively dilute solution (at a point remote from the inlet portion of dilute solution conduit 34) where it mixes with the dilute solution to form a solution of intermediate strength. This is taken off through a line 40 and pumped by a solution pump 41 via an absorbent solution supply conduit 42 to an absorber spray header 32. The solution circuit is completed by this intermediate strength solution of lithium bromide being continuously distributed through nozzles 33 over the absorber tube bundle 17 which is also supplied with cooling water and usually connected in series with the condenser tube bundle.

To withdraw non-condensible gases from the system, a purge unit is provided and comprises a suction pipe 44 extending along the lower portion of the absorber A and outwardly therefrom, the pipe rising vertically upwardly and terminating in a purge chamber 45. A relief line 46 connects the pipe 44 to the interior of the shell 14. The purge chamber contains a vacuum pump (not shown) connected to the pipe 44.

As pointed out in the preliminary remarks, the present invention is directed to a method and apparatus for maintaining the hygroscopic salt content of a refrigerant (in the present case, the salt being lithium bromide and the refrigerant being water) at a predetermined concentration which will lower the freezing point of the water refrigerant to permit cooling the water or brine to temperatures substantially below 35°F., while preventing salt build-up in the refrigerant circuit to a degree which would impair operation of the absorption system.

The control apparatus, indicated generally at CA, comprises a conduit 50 connecting the absorbent solution supply conduit 42 to the refrigerant conduit 27, and a control valve 51 in conduit 50, the valve being operative upon energization of a solenoid 52, to permit absorbent solution from the absorbent circuit to be introduced through conduit 50 to the refrigerant circuit and thereby to provide a lithium bromide concentration in the refrigerant circuit, including receiver 43, effective to lower the freezing point of the water refrigerant. Means are provided for automatically establishing and controlling the salt content in the refrigerant solution in accordance with the electrical conductivity of the refrigerant.

Such means may comprise a salt concentration control indicated generally at H which is adapted to sense the electrical conductivity of the refrigerant in the receiver 43 into which refrigerant flows from pan 16 to the inlet side of refrigerant pump 28. The sensor 53 for salt concentration control H is disposed in the lower portion of receiver 43 so that it is always submerged and in contact with the refrigerant. The salt concentration control itself may be of any conventional type adapted to control the operation of solenoid 52.

The salt concentration control includes sensor 53 which may comprise a pair of electrodes immersed in the refrigerant adapted to directly measure the electrical conductivity of the solution. Since the electrical conductivity is a function of the salt concentration, such device may be calibrated to actuate a switch upon reaching a predetermined salt concentration. Other conventional means, such as a hydrometer for measuring the specific gravity of the refrigerant, may be used in place of the electrical conductivity sensor.

The electrical control circuit for energizing solenoid 52 may be connected directly to the salt concentration control, such solenoid being operable to open and close valve 51 to introduce solution from the solution circuit into the refrigerant circuit as required to maintain a predetermined desired salt concentration in the refrigerant circuit. As noted above, valve 51 is positioned in a tap off line 50 leading from the discharge side of pump 41 to the inlet line 27 of refrigerant pump 28.

It is believed apparent that the salt concentration control H controls operation of valve 51 to introduce solution from the solution circuit into the refrigerant circuit as required to maintain a predetermined desired concentration of absorbent water in the refrigerant circuit effective to lower the temperature of the water refrigerant.

While this invention has been described in connection with a certain specific embodiment thereof, it is to be understood that this is by way of illustration and not by way of limitation; and the scope of the appended claims should be construed as broadly as the prior art will permit.

What is claimed is:

1. A method of producing refrigeration from a closedcircuit, continuous-cycle absorption refrigeration system, which comprises the steps of circulating dilute absorbent solution, including a hygroscopic salt, to a generator in which the refrigerant is vaporized and thereby creating concentrated absorbent solution; passing said concentrated absorbent solution to an absorber; condensing said vaporized refrigerant and passing the condensed refrigerant to an evaporator in vapor communication with the absorber; vaporizing a portion of the condensed refrigerant in said evaporator; providing a refrigerant circuit by passing the unevaporated refrigerant from the evaporation zone and returning it, in spray form to the evaporator; absorbing refrigerant vapors, released in the evaporator in the absorber, withdrawing absorbent solution from the absorber, returning said solution, in spray form, to the absorber wherein the improvement comprises sensing the concentration of salt in said refrigerant by sensing the electrical conductivity of fluid in said refrigerant circuit and passing absorbent solution from said absorber into said refrigerant circuit for mixture with said refrigerant in response to the sensed concentration of said refrigerant to maintain a predetermined concentration of salt in said refrigerant.

2. A method of producing refrigeration from a closedcircuit, continuous-cycle absorption refrigeration system, which comprises the steps of circulating dilute absorbent solution, including a hygroscopic salt, to a generator in which the refrigerant is vaporized and thereby creating concentrated absorbent solution; passing said concentrated absorbent solution to an absorber; condensing said vaporized refrigerant and passing the condensed refrigerant to an evaporator in vapor communication with the absorber; vaporizing a portion of the condensed refrigerant in said evaporator; providing a refrigerant circuit by passing the unevaporated refrigerant from the evaporation zone and returning it, in spray form to the evaporator; absorbing refrigerant vapors, released in the evaporator in the absorber, withdrawing absorbent solution from the absorber, returning said solution, in spray form, to the absorber wherein the improvement comprises sensing the concentration of salt in said refrigerant by sensing the specific gravity of fluid in said refrigerant circuit and passing absorbent solution from said absorber into said refrigerant circuit for mixture with said refrigerant in response to the sensed concentration of said refrigerant to maintain a predetermined concentration of salt in said refrigerant.

3. An absorption refrigeration system comprising: an evaporator for evaporating refrigerant in heat exchange relation with a fluid medium being cooled; an absorber for passing a solution of absorbent and refrigerant in heat exchange relation with a cooling medium to promote absorption of refrigerant vapor by the cooled solution; a generator for passing a heating medium in heat exchange relation with solution to concentrate the solution by vaporizing refrigerant therefrom; a condenser for passing a cooling medium in heat exchange relation with refrigerant vaporized in the generator to condense the refrigerant; a refrigerant circuit for conducting condensed refrigerant from the evaporator and returning the refrigerant, in spray form, to the evaporator; a solution circuit for conducting solution from the absorber and returning the solution, in spray form, to the absorber; passage means for connecting the solution circuit to the refrigerant circuit for mixture of solution with the refrigerant in the refrigerant circuit; sensing means for sensing the concentration of salt in said refrigerant by determining the electrical conductivity of said refrigerant in said refrigerant circuit; and means for controlling the flow of absorbent solution through said passage means in response to said sensing means, whereby a predetermined concentration of salt in said refrigerant is maintained.

* * * * *